United States Patent
Shen

(10) Patent No.: US 9,721,174 B2
(45) Date of Patent: Aug. 1, 2017

(54) USER IDENTIFICATION METHOD AND ELECTRONIC DEVICE

(71) Applicants: Beijing Lenovo Software Ltd., Beijing (CN); Lenovo (Beijing) Co., Ltd., Beijing (CN)

(72) Inventor: Hao Shen, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 36 days.

(21) Appl. No.: 14/855,484

(22) Filed: Sep. 16, 2015

(65) Prior Publication Data

US 2016/0379071 A1 Dec. 29, 2016

(30) Foreign Application Priority Data

Jun. 25, 2015 (CN) .......................... 2015 1 0358212

(51) Int. Cl.
*G06K 9/00* (2006.01)
*G07C 9/00* (2006.01)

(52) U.S. Cl.
CPC ..... *G06K 9/00892* (2013.01); *G07C 9/00158* (2013.01)

(58) Field of Classification Search
CPC  G06K 9/00892; G07C 9/00158; B25J 9/1694
See application file for complete search history.

(56) References Cited

U.S. PATENT DOCUMENTS

| 7,787,697 | B2* | 8/2010 | Ritzau | G06K 9/228 382/115 |
|---|---|---|---|---|
| 9,430,629 | B1* | 8/2016 | Ziraknejad | H04L 63/0861 |
| 2002/0152010 | A1* | 10/2002 | Colmenarez | B60R 25/2045 701/36 |
| 2006/0210119 | A1* | 9/2006 | Willis | G06K 9/00892 382/115 |
| 2008/0044063 | A1* | 2/2008 | Friedman | A61B 3/1216 382/117 |
| 2008/0069411 | A1* | 3/2008 | Friedman | G06K 9/00255 382/118 |
| 2009/0138405 | A1* | 5/2009 | Blessing | G06F 21/32 705/67 |
| 2010/0296706 | A1* | 11/2010 | Kaneda | G06K 9/00281 382/118 |

(Continued)

*Primary Examiner* — John Strege
(74) *Attorney, Agent, or Firm* — Harness, Dickey & Pierce, P.L.C.

(57) ABSTRACT

A user identification method and a user identification electronic device are provided. The method includes: obtaining user state information of a user; determining available user identification modes based on the user state information; determining user identification accuracy information corresponding to each of the available user identification modes; determining a selected user identification mode, based on a service requiring user identification and the user identification accuracy information; and performing user identification in the selected user identification mode. With the method or the electronic device, the user can be identified based on various types of information, thus an application range of the user identification method is expanded, and robustness of the user identification method is improved.

6 Claims, 6 Drawing Sheets

(56) References Cited

U.S. PATENT DOCUMENTS

| | | | | |
|---|---|---|---|---|
| 2011/0231911 A1* | 9/2011 | White | ............... | H04L 63/08 |
| | | | | 726/7 |
| 2015/0242605 A1* | 8/2015 | Du | ............... | G06F 21/32 |
| | | | | 726/7 |
| 2015/0294171 A1* | 10/2015 | Gn | ............... | G06F 21/32 |
| | | | | 382/116 |
| 2016/0087952 A1* | 3/2016 | Tartz | ............... | H04W 12/06 |
| | | | | 455/411 |
| 2016/0328600 A1* | 11/2016 | Che | ............... | G06K 9/0008 |

* cited by examiner

USER IDENTIFICATION METHOD AND ELECTRONIC DEVICE

This application claims priority to Chinese Patent Application No. 201510358212.1, titled "USER IDENTIFICATION METHOD AND ELECTRONIC DEVICE", filed with the Chinese State Intellectual Property Office on Jun. 25, 2015, which is incorporated by reference in its entirety herein.

FIELD

The disclosure relates to the field of data processing, and in particular to a user identification method and a user identification electronic device.

BACKGROUND

With development of information technology, great progress has been made on intelligent robot technology. However, it is still an open problem how to enable an intelligent robot to better service for users, and solutions thereof are highly required in industry.

In conventional technology, in order to provide a targeted service for a particular user, a robot needs to identify the user. However, in the conventional technology, a user is identified based on image information of a human face. Hence, the user cannot be identified without face image information of the user due to a shortage of information source.

SUMMARY

A user identification method and a user identification electronic device are provided according to embodiments of the disclosure, technical solutions as follows are provided according to embodiments of the present disclosure.

A user identification method is provided, the user identification method includes:

obtaining user state information of a user;

determining available user identification modes based on the user state information;

determining user identification accuracy information corresponding to each of the available user identification modes;

determining a selected user identification mode, based on a service requiring user identification and the user identification accuracy information; and performing user identification in the selected user identification mode.

A user identification electronic device includes:

a user state information obtaining unit, configured to obtain user state information of a user;

an available user identification mode determining unit, configured to determine available user identification modes based on the user state information;

a user identification accuracy information determining unit, configured to determine user identification accuracy information corresponding to each of the available user identification modes;

a selected user identification mode determining unit, configured to determine a selected user identification mode, based on a service requiring user identification and the user identification accuracy information; and a user identification unit, configured to perform user identification in the selected user identification mode.

According to the embodiments of the present disclosure, the present disclosure may have following advantages:

with the user identification method and the user identification electronic device according to the embodiment of the disclosure, user state information of a user is obtained; and available user identification modes are determined based on the user state information. The available user identification mode is determined among various types of identification modes, based on the user state information. Hence, the user may be identified based on various types of information, and thus an application range of the user identification method is expanded, and robustness of the user identification method is improved. Furthermore, a selected user identification mode is determined based on a service requiring user identification and the user identification accuracy information, thus reliability of an identification result is ensured.

BRIEF DESCRIPTION OF THE DRAWINGS

For technical solutions according to embodiments of the present disclosure or according to conventional technology, drawings for description of embodiments of the disclosure are described briefly as follows. It is apparent that the drawings in the following description merely illustrate a few embodiments of the present disclosure. For those skilled in the art, other drawings may be obtained according to these drawings without any creative work.

DETAILED DESCRIPTION OF THE EMBODIMENTS

Technical solutions according to embodiments of the present disclosure are described clearly and completely hereinafter in conjunction with the drawings in the embodiments of the present disclosure. Apparently, the described embodiments are merely a few rather than all embodiments of the present disclosure. Other embodiments obtained by those skilled in the art without any creative work based on the embodiments of the present disclosure fall in the scope of protection of the present disclosure.

In order for clarity of features and virtues of the present disclosure, the embodiments of the present disclosure are described in detail in conjunction with the drawings.

Figure 1:
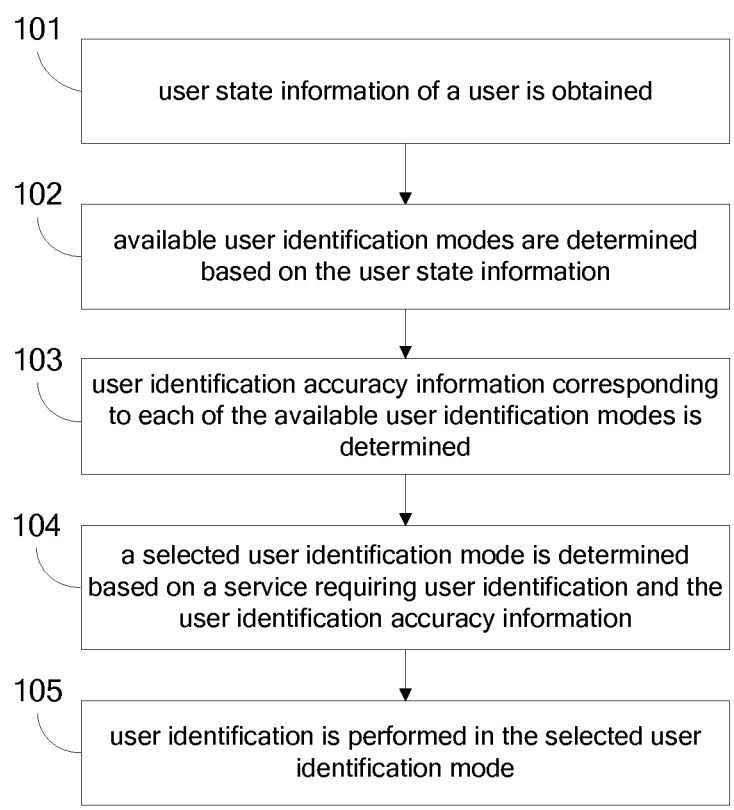
FIG. 1 is a flowchart of a user identification method according to a first embodiment of the present disclosure.

FIG. 1 is a flowchart of a user identification method according to a first embodiment of the present disclosure. As shown in FIG. 1, the method may include following steps 101 to 105.

In step 101, user state information of a user is obtained.

First, it should be noted that, the method according to the embodiment of the present disclosure may be performed by a robot provided with a sensor. The robot may obtain the user state information via the sensor. The sensor may be a device such as a camera or a microphone.

The user state information may include behavior information, gesture information or the like of the user. For example, the gesture information may indicate that the user is facing towards or against the robot.

In step 102, available user identification modes are determined based on the user state information.

There may be multiple user identification modes. For example, it may be face identification based on face image information of the user, voice identification based on voice of the user, or identification based on dressing of the user. However, maybe not all the identification modes are available at a certain moment, because in some cases information sources necessary for some identification modes are not available in time. For example, when the user is facing against the robot, the robot cannot obtain the face image information of the user, thus the user cannot be identified in the face identification mode; and when the user is silent, the robot cannot obtain voice information of the user, thus the user cannot be identified in the voice identification mode.

Hence, in this embodiment of the present disclosure, the available user identification modes may be determined based on the user state information. For example, it can be determined that the face identification mode is the available user identification mode in a case that the face image information of the user is obtained; and it can be determined that the voice identification mode is the available user identification mode in a case that the voice information of the user is obtained.

In step 103, user identification accuracy information corresponding to each of the available user identification modes is determined.

Different identification modes generally result in different accuracy in identifying a user. For example, the face identification generally results in higher accuracy than the voice identification.

It should be noted that, a same identification mode may have different identification accuracy in different application scenarios. For example, user identification based on height information of a user may have high identification accuracy, in a case that in the application scenario there are only two users and the two users significantly differ in height.

In step 104, a selected user identification mode is determined based on a service requiring user identification and the user identification accuracy information.

Different services may require different user identification accuracy. For example, in a case that the robot performs a following task, an identity of a user may be determined in an identification mode in low identification accuracy as long as the user stays within an image capturing range of the robot after the robot begins to follow the user. In a case that an incoming message from another user to a particular user is received by the robot, an identification mode in a higher identification accuracy is required to avoid privacy leakage.

In step 105, user identification is performed in the selected user identification mode.

In summary, in this embodiment, user state information of the user is obtained; and an available user identification mode is determined based on the user state information. The available user identification mode is selected from various identification modes according to the user state information. Hence, the user may be identified based on multiple types of information, thus an application range of the user identification method is extended, and robustness of the user identification method is improved. Furthermore, the selected user identification mode is determined based on a service requiring user identification and the user identification accuracy information, thus reliability of an identification result is ensured.

In practice, the determining a selected user identification mode may include:

obtaining user identification accuracy requirement information corresponding to the service; and determining, among the available user identification modes, a user identification mode having a user identification accuracy higher than or equal to a level of a user identification accuracy required by the user identification accuracy requirement information.

In the above steps, user identification accuracy requirement information corresponding to each of the services may be preset, and identification accuracy of each of the user identification modes may be determined.

Figure 2:
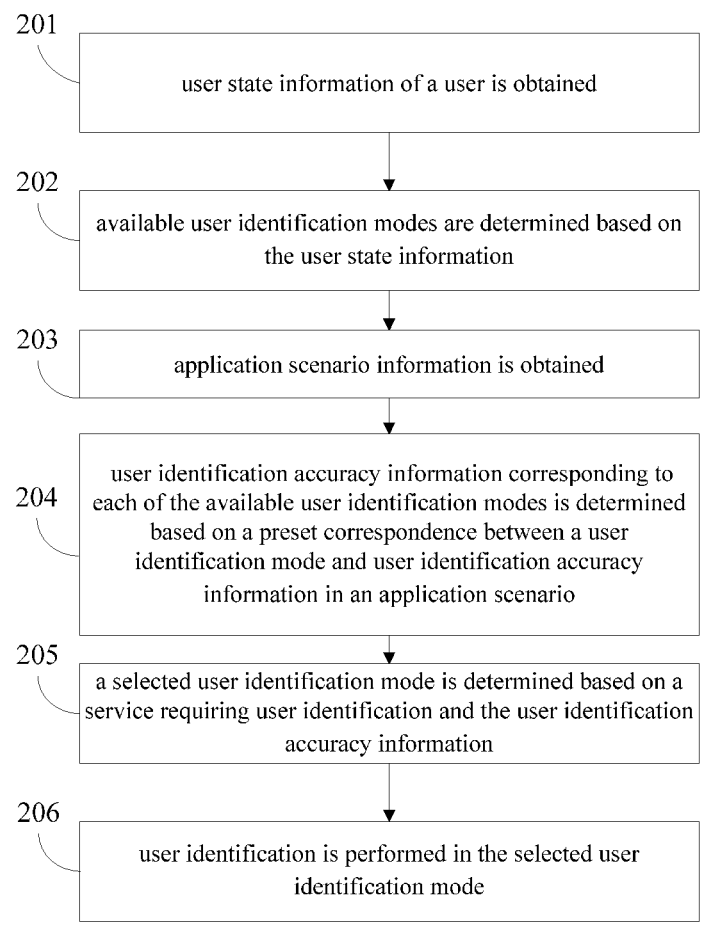
FIG. 2 is a flowchart of a user identification method according to a second embodiment of the present disclosure.

FIG. 2 is a flowchart of a user identification method according to a second embodiment of the present disclosure. As shown in FIG. 2, the method may include following steps 201 to 206.

In step 201, user state information of a user is obtained.

In step 202, available user identification modes are determined based on the user state information.

In step 203, application scenario information is obtained.

The application scenario information may indicate an application scenario of the user identification method.

In step 204, user identification accuracy information corresponding to each of the available user identification modes is determined based on a preset correspondence between a user identification mode and user identification accuracy information in an application scenario.

For example, the application scenario information indicates that the application scenario is a home of a user A. There are three users in the home of the user A. The three users have similar heights, significantly different voiceprint information and significantly different facial features. Then, identification accuracy of voice identification and face identification may be preset to be high in the application scenario, and identification accuracy of an identification mode based on the height may be preset to be low.

In step 205, a selected user identification mode is determined based on a service requiring user identification and the user identification accuracy information.

In step 206, user identification is performed in the selected user identification mode.

In this embodiment, the application scenario information is obtained; and the user identification accuracy information corresponding to each of the available user identification modes is determined based on the preset correspondence between the user identification mode and the user identification accuracy information in an application scenario. As for a certain identification mode, various identification accuracy information corresponding to various application scenarios can be obtained, thereby improving pertinence of selecting an identification mode.

Figure 3:
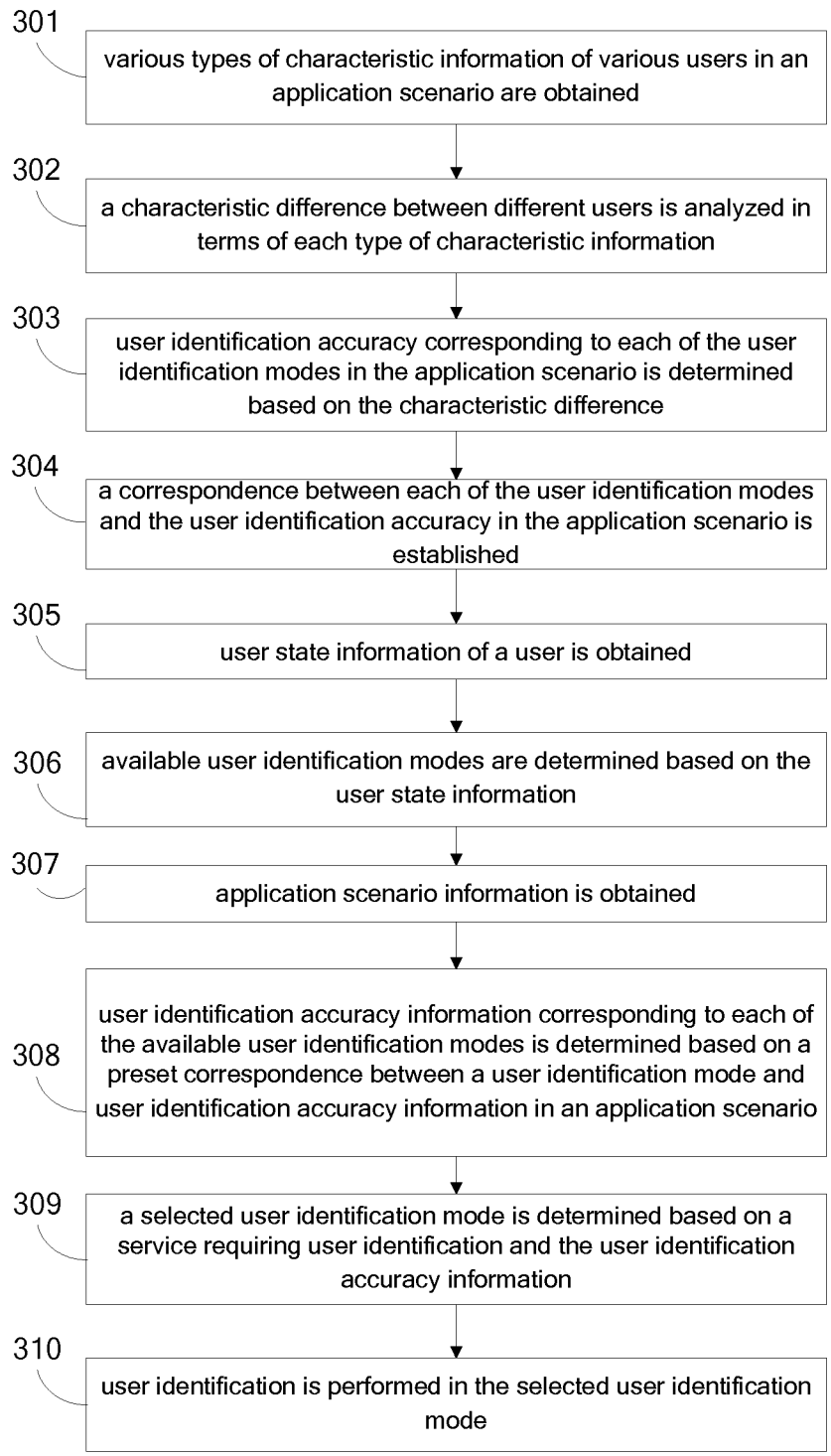
FIG. 3 is a flowchart of a user identification method according to a third embodiment of the present disclosure.

FIG. 3 is a flowchart of a user identification method according to a third embodiment of the present disclosure. As shown in FIG. 3, the method may include following steps 301 to 310.

In step 301, various types of characteristic information of various users in an application scenario are obtained.

The application scenario may be a home of a certain user. The characteristic information may include information on height, dressing a face image, voice or the like.

There may be multiple users in the application scenario. For example, there may be three users, such as a father, a mother and a child, in a family of three people.

In step 302, a characteristic difference between different users is analyzed in terms of each type of characteristic information.

For a certain type of characteristic information, different users may have a great or a small difference in the characteristic information. The characteristic difference depends on specific characteristic of various users.

For example, for the family of three people described above, various users significantly differ in the characteristic information on height, in a case that the father is significantly taller than the mother and the mother is significantly taller than the child. Alternatively, various users have a small characteristic difference in the characteristic information on height, in a case that the father, the mother and the child have a similar height.

In step 303, user identification accuracy corresponding to each of the user identification modes in the application scenario is determined based on the characteristic difference.

An identification mode corresponding to characteristic information having a larger characteristic difference has higher user identification accuracy in the application scenario.

For example, as described above, various users significantly differ in the characteristic information on height, in a case that the father is significantly taller than the mother and the mother is significantly taller than the child. In the application scenario, an identification mode based on height originally having ordinary accuracy has a high user identification accuracy.

In practice, the determining, based on the characteristic difference, user identification accuracy corresponding to each of the user identification modes in the application scenario comprises:

determining an identification weight of each of the characteristic information according to the characteristic difference, wherein the characteristic information having a larger characteristic difference has a greater weight; and determining, based on the identification weight of the characteristic information, user identification accuracy corresponding to an user identification mode adopting the characteristic information in the application scenario.

In the above step, the determining, based on the identification weight of the characteristic information, user identification accuracy corresponding to an user identification mode adopting the characteristic information in the application scenario may include obtaining user identification accuracy corresponding to the user identification mode in the application scenario by multiplying a default identification accuracy of the user identification mode by (the identification weight+1). Practically, user identification accuracy corresponding to the user identification mode in the application scenario may be determined by using other methods based on the identification weight, which is not limited here.

In step 304, a correspondence between each of the user identification modes and the user identification accuracy in the application scenario is established.

In step 305, user state information of a user is obtained.

In step 306, available user identification modes are determined based on the user state information.

In step 307, application scenario information is obtained.

In step 308, user identification accuracy information corresponding to each of the available user identification modes is determined based on a preset correspondence between a user identification mode and user identification accuracy information in an application scenario.

In step 309, a selected user identification mode is determined based on a service requiring user identification and the user identification accuracy information.

In step 310, user identification is performed in the selected user identification mode.

In this embodiment, various types of characteristic information on various users in the application scenario are obtained. The characteristic difference between various users is analyzed in terms of each type of characteristic information. The user identification accuracy corresponding to each of the user identification modes in the application scenario is determined based on the characteristic difference. The correspondence between each of the user identification modes and the user identification accuracy in the application scenario is established. The user identification accuracy corresponding to each of the user identification modes in the application scenario may be determined based on actual characteristic difference between users in the application scenario, thereby performing user identification in various types of identification modes more flexibly.

Figure 4:
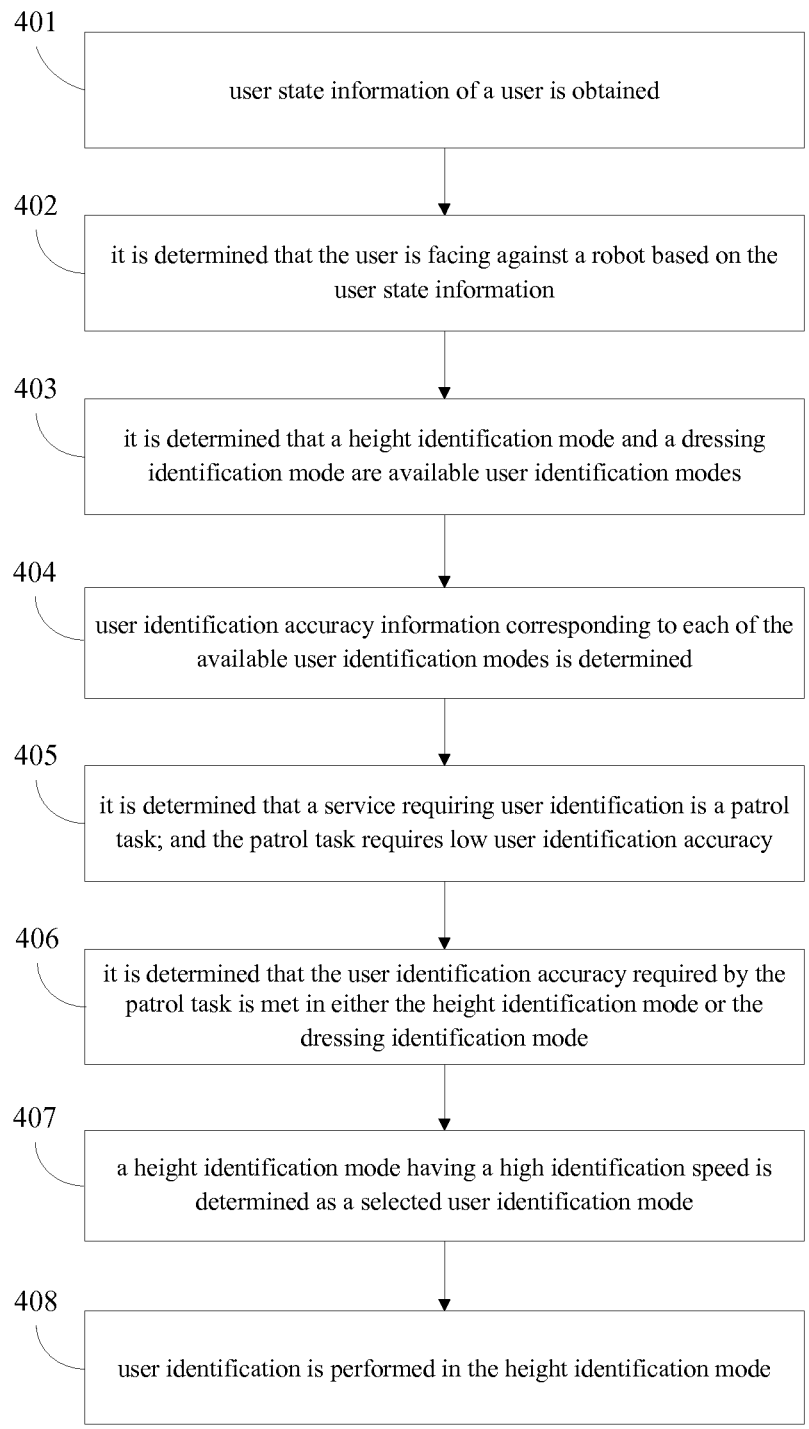
FIG. 4 is a flowchart of a user identification method according to a fourth embodiment of the present disclosure.

FIG. 4 is a flowchart of a user identification method according to a fourth embodiment of the present disclosure. As shown in FIG. 4, the method may include following steps 401 to 408.

In step 401, user state information of a user is obtained.

In step 402, it is determined that the user is facing against a robot based on the user state information.

In this case, the robot cannot obtain face image information of the user but can obtain height information and dressing information of the user.

In step 403, it is determined that a height identification mode and a dressing identification mode are available user identification modes.

In step 404, user identification accuracy information corresponding to each of the available user identification modes is determined.

In this embodiment, the users in the application scenario have a small height difference but a significant dressing difference. Hence, the dressing identification mode has higher identification accuracy than the height identification mode.

In step 405, it is determined that a service requiring user identification is a patrol task; and the patrol task requires low user identification accuracy.

In step 406, it is determined that the user identification accuracy required by the patrol task is met in either the height identification mode or the dressing identification mode.

In step 407, a height identification mode having a high identification speed is determined as a selected user identification mode.

In step 408, user identification is performed in the height identification mode.

In this embodiment, an example of user identification based on height is provided.

Figure 5:
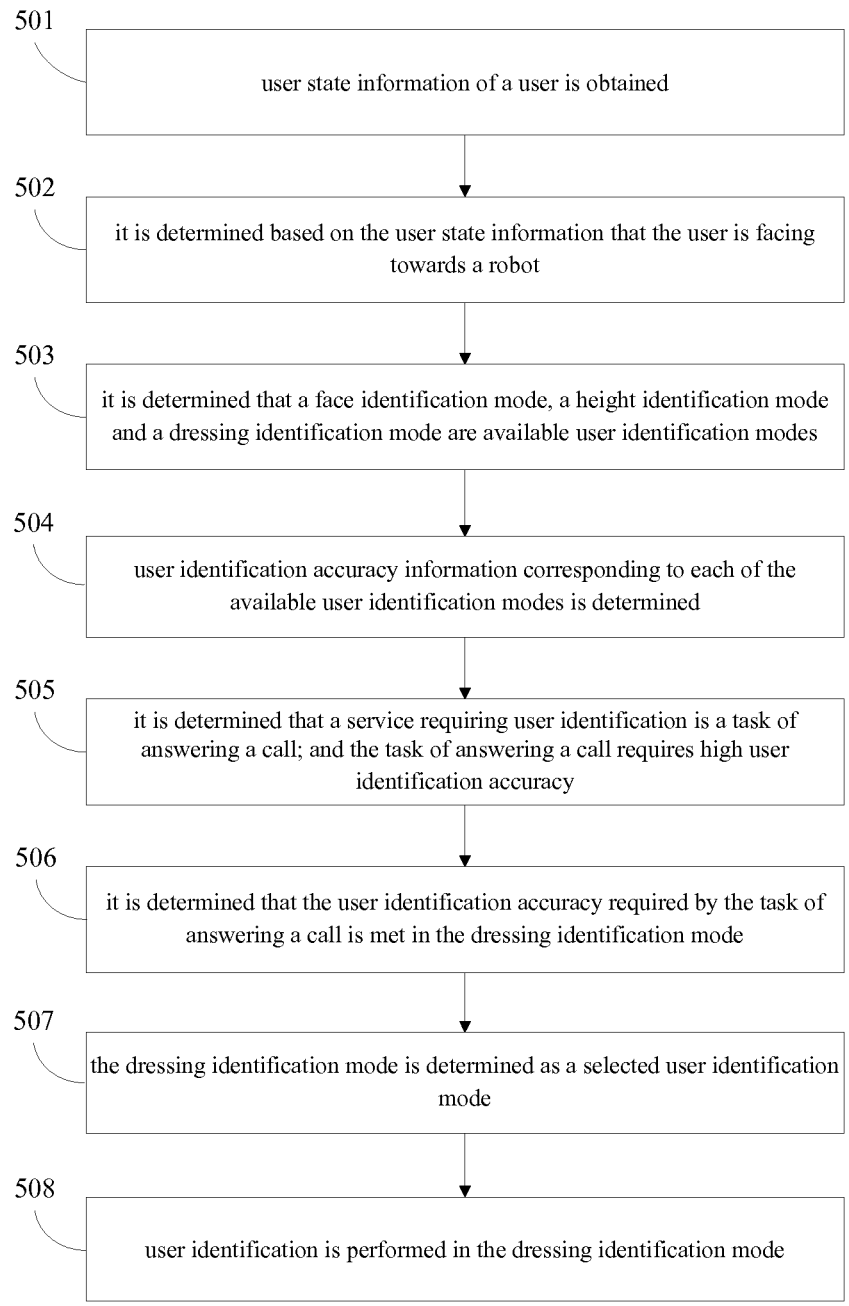
FIG. 5 is a flowchart of a user identification method according to a fifth embodiment of the present disclosure.

FIG. 5 is a flowchart of a user identification method according to a fifth embodiment of the present disclosure. As shown in FIG. 5, the method may include following steps 501 to 508.

In step 501, user state information of a user is obtained.

In step 502, it is determined based on the user state information that the user is facing towards a robot.

In this case, the robot can obtain face image information of the user and can obtain height information and dressing information of the user.

In step 503, it is determined that a face identification mode, a height identification mode and a dressing identification mode are available user identification modes.

In step 504, user identification accuracy information corresponding to each of the available user identification modes is determined.

In this embodiment, the users in the application scenario are twins, and the users have a small face image difference and a small height difference but a significant dressing difference. Hence, the dressing identification mode has higher identification accuracy than the height identification mode and the face identification mode.

In step 505, it is determined that a service requiring user identification is a task of answering a call; and the task of answering a call requires high user identification accuracy.

In step 506, it is determined that the user identification accuracy required by the task of answering a call is met in the dressing identification mode.

In step 507, the dressing identification mode is determined as a selected user identification mode.

In step 508, user identification is performed in the dressing identification mode.

In this embodiment, an example of user identification based on dressing is disclosed.

It should be noted that, in practice, the identification modes in the embodiments of the present disclosure may be repeated and/or combined for obtaining an identification result in higher accuracy. For example, in the embodiment as shown in FIG. 5, after user identification is performed in the dressing identification mode and a user having an identity for answering the call is determined, the robot may be controlled to move to the vicinity of the user and prompt the user to input fingerprint information; after the user inputs the fingerprint information, the robot may determine that the fingerprint information is accepted and a fingerprint identification mode is available; accuracy required by the task of answering is met in the fingerprint identification mode, and the fingerprint identification mode is determined as a selected user identification mode; and user identification is performed in the fingerprint identification mode. User identification accuracy may be further improved in the fingerprint identification mode.

It is to be further noted that, in an embodiment of the present disclosure, the obtaining height information on a user may include:

obtaining position information of the robot;

obtaining depth information on user image information in an image obtained by the robot;

determining a distance between the user and the robot based on the depth information;

obtaining relative height information of an user head image in the image obtained by the robot;

obtaining pitch angle attitude information of a camera of the robot; and determining the height information of the user based on the relative height information, the pitch angle attitude information and the distance.

Figure 6:
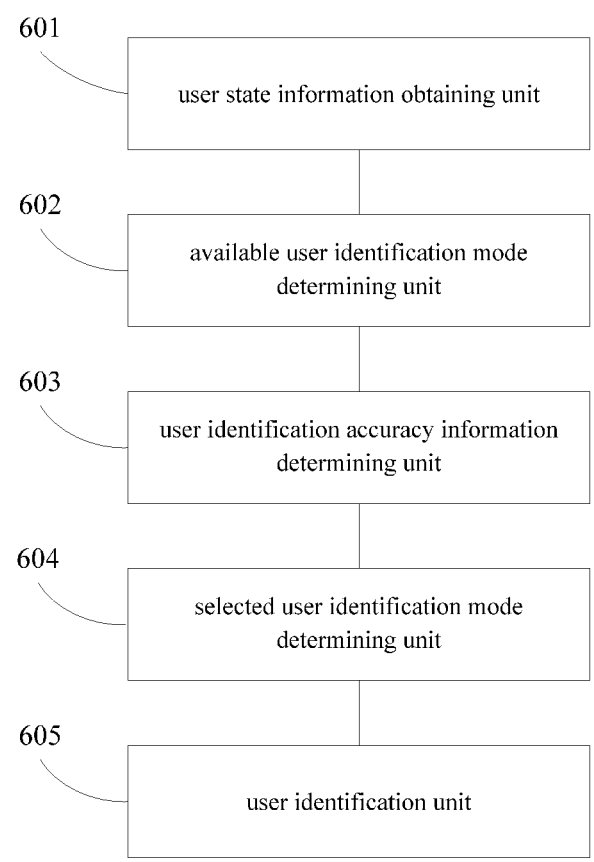
FIG. 6 is a flowchart of a user identification electronic device according to an embodiment of the present disclosure.

An electronic device is further disclosed in the present disclosure. FIG. 6 is a flowchart of a user identification electronic device according to an embodiment of the present disclosure. As shown in FIG. 6, the electronic device may include:

a user state information obtaining unit 601, configured to obtain user state information of a user;

an available user identification mode determining unit 602, configured to determining available user identification modes based on the user state information;

a user identification accuracy information determining unit 603, configured to determine user identification accuracy information corresponding to each of the available user identification modes;

a selected user identification mode determining unit 604, configured to determine a selected user identification mode, based on a service requiring user identification and the user identification accuracy information; and a user identification unit 605, configured to perform user identification in the selected user identification mode.

In this embodiment, the user state information of the user is obtained; and the available user identification modes are determined based on the user state information. The available user identification mode is determined among various types of identification modes, based on the user state information. Hence, the user can be identified based on various types of information, and thus an application range of the user identification method is expanded, and robustness of the user identification method is improved. Furthermore, the selected user identification mode is determined based on the service requiring user identification and the user identification accuracy information, thus reliability of an identification result is ensured.

In practice, the selected user identification mode determining unit 604 may include:

a user identification accuracy requirement information obtaining sub-unit, configured to obtain user identification accuracy requirement information corresponding to the service; and a user identification mode selecting sub-unit, configured to determine, among the available user identification modes, a user identification mode having a user identification accuracy higher than or equal to a level of a user identification accuracy required by the user identification accuracy requirement information.

In practice, the electronic device may further include:

an application scenario information obtaining unit, configured to obtain application scenario information before user identification accuracy corresponding to each of the used available user identification modes is determined;

where the user identification accuracy information determining unit 603 may include:

a user identification accuracy information determining sub-unit, configured to determine user identification accuracy information corresponding to each of the user available identification modes according to a preset correspondence between a user identification mode and user identification accuracy information in an application scenario.

In practice, the electronic device may further include:

a characteristic information obtaining unit, configured to obtain various types of characteristic information of each user in an application scenario;

a characteristic difference analyzing unit, configured to analyze a characteristic difference between different users in terms of each type of characteristic information;

a user identification accuracy determining unit, configured to determine, based on the characteristic difference, user identification accuracy corresponding to each of the user identification modes in the application scenario; and a correspondence establishing unit, configured to establish a correspondence between each of the various user identification modes and the user identification accuracy in the application scenario.

In practice, the user identification accuracy determining unit 603 may include:

an identification weight determining sub-unit, configured to determine an identification weight of each of the characteristic information according to the characteristic difference, wherein the characteristic information having a greater characteristic difference has a greater weight; and a user identification accuracy determining sub-unit, configured to determine, based on the identification weight of the characteristic information, user identification accuracy corresponding to an user identification mode adopting the characteristic information in the application scenario.

The embodiments of the present disclosure are described herein in a progressive manner, with an emphasis placed on differences between each embodiment and the other embodiments. The same or similar parts among the embodiments can be referred to each other. For the electronic device disclosed in the embodiments, the corresponding description is relatively brief because the apparatus correspond to the methods provided in the embodiments. The relevant parts may be referred to the description of the method.

The principles and implementations of the disclosure are illustrated by examples, and the above description of the embodiments is merely to help understanding the method and key idea of disclosure. In addition, those skilled in the art may modifies the embodiments and the application range based on the idea of the disclosure. In summary, the specification should not be construed as limitations to the disclosure.

The invention claimed is:

1. A user identification method, comprising:
obtaining various types of characteristic information of each user in an application scenario;
analyzing a characteristic difference between different users in terms of each type of characteristic information;
determining, based on the characteristic difference, user identification accuracy corresponding to each of the user identification modes in the application scenario;
establishing a correspondence between each of the user identification modes and the user identification accuracy in the application scenario;
obtaining user state information of a user;
determining available user identification modes based on the user state information;
obtaining application scenario information;
determining user identification accuracy information corresponding to each of the available user identification modes, according to a preset correspondence between a user identification mode and user identification accuracy information in an application scenario represented by the application scenario information;
determining a selected user identification mode, based on a service requiring user identification and the user identification accuracy information; and
performing user identification in the selected user identification mode.

2. The method according to claim 1, wherein the determining a selected user identification mode comprises:
obtaining user identification accuracy requirement information corresponding to the service; and
determining, among the available user identification modes, a user identification mode having a user identification accuracy higher than or equal to a level of a user identification accuracy required by the user identification accuracy requirement information.

3. The method according to claim 1, wherein the determining, based on the characteristic difference, user identification accuracy corresponding to each of the user identification modes in the application scenario comprises:
determining an identification weight of each of the characteristic information according to the characteristic difference, wherein the characteristic information having a greater characteristic difference has a greater weight; and
determining, based on the identification weight of the characteristic information, user identification accuracy corresponding to an user identification mode adopting the characteristic information in the application scenario.

4. A user identification electronic device, comprising a sensor, a processor and a memory having processor-executable instructions stored therein, wherein the instructions when executed by the processor, configure the user identification electronic device to:
obtain various types of characteristic information of each user in an application scenario via the sensor;
analyze a characteristic difference between different users in terms of each type of characteristic information;
determine, based on the characteristic difference, user identification accuracy corresponding to each of the user identification modes in the application scenario;
establish a correspondence between each of the various user identification modes and the user identification accuracy in the application scenario;
obtain user state information of a user;
determine available user identification modes based on the user state information;
obtain application scenario information via the sensor;
configured to determine user identification accuracy information corresponding to each of the available user identification modes according to a preset correspondence between a user identification mode and user identification accuracy information in an application scenario represented by the application scenario information;
determine a selected user identification mode, based on a service requiring user identification and the user identification accuracy information; and
perform user identification in the selected user identification mode.

5. The electronic device according to claim 4, wherein determining the selected user identification modes comprises:
obtaining user identification accuracy requirement information corresponding to the service; and
determining, among the available user identification modes, a user identification mode having a user identification accuracy higher than or equal to a level of a user identification accuracy required by the user identification accuracy requirement information.

6. The electronic device according to claim 4, wherein determining, based on the characteristic difference, the user identification accuracy corresponding to each of the user identification modes in the application scenario comprises:
determining an identification weight of each of the characteristic information according to the characteristic difference, wherein the characteristic information having a greater characteristic difference has a greater weight; and
determining, based on the identification weight of the characteristic information, user identification accuracy corresponding to an user identification mode adopting the characteristic information in the application scenario.

* * * * *